Dec. 28, 1937.    A. A. DOTY    2,103,743
SEALED FASTENING DEVICE
Filed April 30, 1935
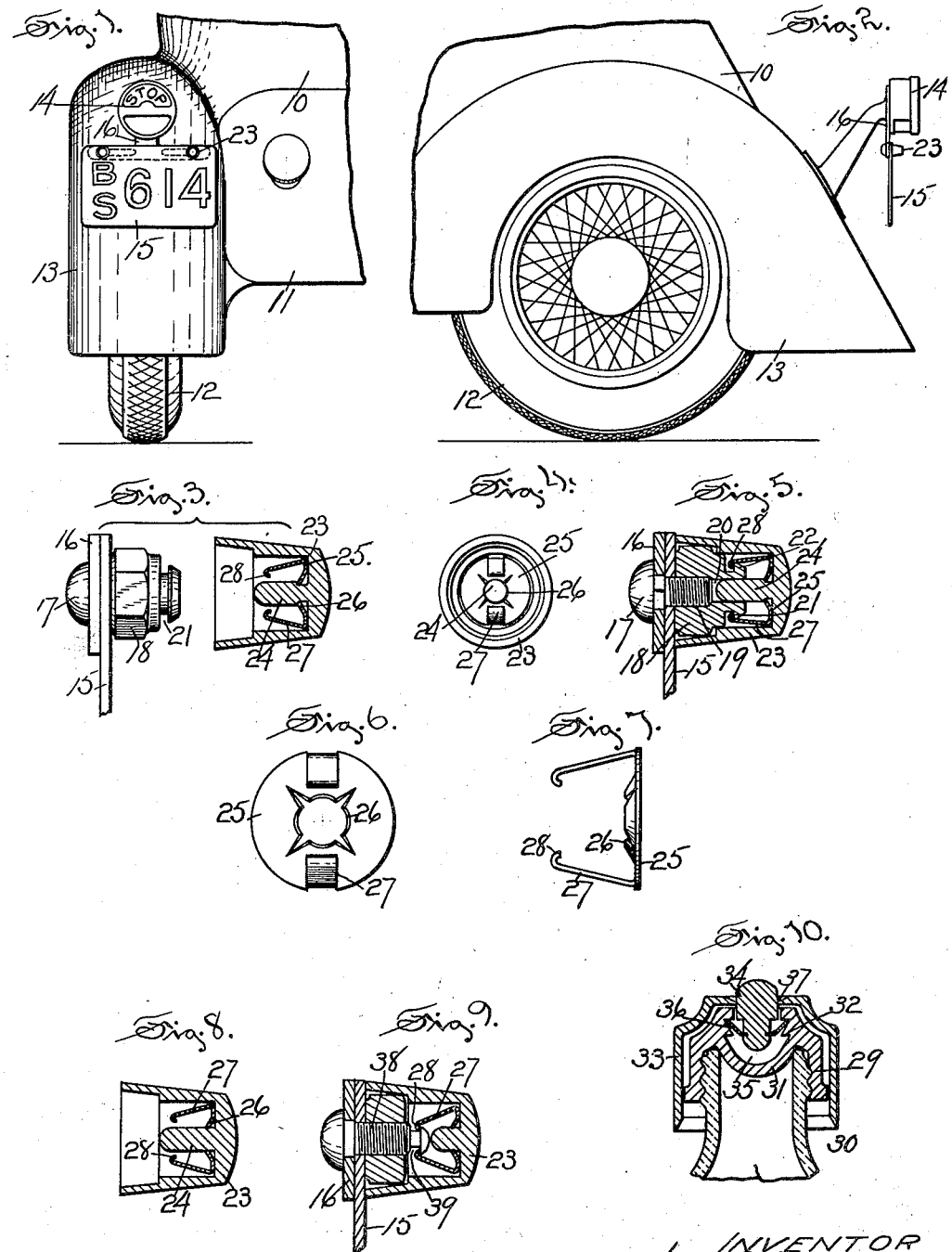
INVENTOR
Arthur A. Doty.
by
Arthur B. Jenkins,
ATTORNEY Patented Dec. 28, 1937

2,103,743

UNITED STATES PATENT OFFICE 2,103,743

SEALED FASTENING DEVICE

Arthur A. Doty, East Hartford, Conn., assignor of one-third to Raymond S. Holcomb, East Hartford, Conn., and one-third to Howard L. Bitter, West Hartford, Conn.

Application April 30, 1935, Serial No. 19,035

6 Claims. (Cl. 292—327)

My invention relates to the class of devices by means of which objects may be so sealed in place that unauthorized removal may be readily detected, and an object of my invention, among others, is to provide a fastening device of this type that shall be particularly effective in producing the results for which it is intended.

One form of a fastening device embodying my invention and in the construction and use of which the objects herein set out, as well as others, may be attained is illustrated in the accompanying drawing in which Figure 1 is a rear view of the lower part of one side of an automobile showing a marker secured by my improved fastening device.

Figure 2 is a side view of the same.

Figure 3 is a view on enlarged scale showing the manner of securing a marker in place.

Figure 4 is an end view of the sealing cap looking into the cavity therein.

Figure 5 is a view in lengthwise section through the fastening device.

Figure 6 is a view on further enlarged scale of the retainer.

Figure 7 is a side view of the same.

Figure 8 illustrates a little different means for securing the spider within the cap.

Figure 9 illustrates a little different manner for retaining the cap in place.

Figure 10 illustrates my improved fastening means as applied to a bottle closure.

Various sorts of articles are in use at the present time which it is desired shall be sealed as to the whole or parts thereof so that removal of such articles or parts may be readily detected. My improved sealed fastening device is so constructed that it may be applied to various devices for the purpose above described.

As an illustration, it is quite common practice, although perhaps not generally known, to make use of automobile markers on several different automobiles, thereby enabling the use of several automobiles for the payment of a single license fee, and while my invention is not limited to any specific instance of use, as it is particularly adapted for securing the markers of vehicles in place, I have selected such for the purpose of illustrating my invention herein.

In the accompanying drawing the numeral 10 denotes the body of an automobile, 11 the gas tank, 12 a rear wheel, 13 a rear mud guard, 14 a stop light and 15 a marker secured to the bracket 16 by means of my improved fastening device.

This device comprises a screw bolt 17 which extends through the bracket 16 and marker 15, as shown in Fig. 5 of the drawing, the thread of said bolt being engaged by a nut 18. The hole through the nut is preferably threaded as at 19 for a portion of its length only to engage the bolt, the rest of the hole 20 being unthreaded. An annular groove 21 is formed on the nut creating a lip 22 extending preferably entirely around the end of the nut.

A sealing cap 23 of frangible material is formed to fit over the nut and to rest snugly against the marker 15. This cap has a bearing pin or stud 24 extending inwardly from its closed end and closely fitting the hole 20 in the nut for the purpose of so retaining the cap rigidly in place as to prevent any looseness that would cause rattling.

A spider is securely fastened within the cap this spider comprising a base 25 preferably of disk shape and having a hole at its center to receive the pin 24. This hole is bounded by jaws 26 constructed to enter an annular groove in the pin 24 and thereby secure the spider tightly in place. Spring retaining fingers 27 project from opposite sides of the base 25, these fingers having bent ends 28 to engage the lip 22 within the groove 21 and thereby securely fasten the cap 23 in place so that the latter may not be removed without detection.

If desired the end of the cap 23 may be provided with suitable insignia to denote the authority for use of the device, which insignia may be the seal of a state when the device is employed for securing the fastenings for a marker plate or other article to an automobile.

In the application of the device as shown in Fig. 10 a bottle closure is illustrated as secured by my improved fastening device, a closure 29 being attached to the bottle neck 30 in any suitable manner, said closure having a projection 31 fitted within the mouth of the bottle and having a recess with annular shoulders 32 therein.

The cap 33 is formed to cover the closure and extend downwardly therefrom around the neck of the bottle. This cap is formed of frangible material and includes a support 34 projecting downwardly within the cavity 35 within the closure. Spring retaining fingers 36 are secured to the support 34 in any suitable manner, as herein shown these fingers project from a base fitted into an annular groove in the support. Said fingers project outwardly in position to engage the shoulders 32 so that when the cap is pressed downwardly into place the fingers will automatically spring outwardly to engage said shoulders and thereby prevent removal of the cap. The support 34 has a weak connection with the cap 33, as herein shown a groove 37 being formed so that the support may be easily broken away from the cap.

The cap having been pressed downwardly into position as shown in Fig. 10 it will be observed that it cannot be removed by reason of the engagement of the spring fingers with the shoulders. When it is desired to remove the cap for access to the contents of the bottle the support 34 is forced downwardly breaking its connection with the main part of the cap and the spring fingers thereby engage the inner shoulder to retain the support in this position.

In the structure shown in Figs. 8 and 9 the jaws 26 of the spider are formed to bite into the substance of the pin 24 to hold the spider and cap in place. In the structure shown in Fig. 9 the bolt 38 has its end reduced and formed with a groove 39 within which the fingers 27 engage to hold the cap in place, it being noted that the groove is formed in the bolt instead of in the nut as shown in preceding figures.

In accordance with the provisions of the patent statutes I have described the principles of operation of my invention together with the device which I now consider to represent the best embodiment thereof; but I desire to have it understood that the device shown is only illustrative and that the invention may be carried out by other means and applied to uses other than those above set out.

I claim:

1. A sealed fastening device including two holding members engaged one with the other, a sealing cap of frangible material to cover and enclose one of said members, an interengaging stud and hole on one of said members and cap to tightly hold said cap to prevent rattling thereof and means within said cap to permanently retain said cap in place, said means comprising a spider having a hole to receive said stud, jaws to engage said stud to hold the spider in place, and retaining fingers to engage one of said holding members to permanently secure the cap in place.

2. A sealed fastening device including two holding members removably engaged one with the other, one of said members having a lip, a sealing cap of frangible material to cover and enclose one of said members, and means within said cap to engage said lip to permanently retain said cap in place, said means, when the cap is in place, being inaccessible for operation for releasing action.

3. A sealed fastening device including two holding members engaged one with the other, an annular groove formed in one of said members to provide a shoulder, a sealing cap of frangible material to enclose and cover said member, and means within said cap to permanently retain it in place, said means comprising a spider having a hole to receive said stud, jaws to engage said stud to hold the spider in place, and retaining fingers to engage the lip formed by said annular groove on one of said holding members to permanently secure the cap in place.

4. A sealed fastening device including two holding members engaged one with the other, a shoulder formed on one of said members, a sealing cap of frangible material to enclose and cover one of said members, said cap having a projecting stud, means within said cap to automatically engage said shoulder and permanently retain the cap in place, said means comprising a spider having a hole to receive said stud, jaws to engage said stud to hold the spider in place, and retaining fingers to engage one of said holding members to permanently secure the cap in place, and a bearing pin projecting from the interior of said cap into the hole in the end of said member to tightly hold said cap to prevent rattling thereof.

5. A sealed fastening device including two holding members, one of which has an annular groove to form a shoulder, a sealing cap of frangible material to cover and enclose said grooved member, said cap having a projecting stud, means for retaining said cap in place, said means comprising a spider having a hole to receive said stud, jaws to engage said stud to hold the spider in place, and retaining fingers to engage one of said holding members to permanently secure the cap in place.

6. A sealed fastening device including two holding members engaged one with the other, an annular groove forming a shoulder on one of said members, a sealing cap of frangible material to cover and enclose said member, a post projecting from the bottom of the cavity in said cap to enter the hole in the end of said member, and a spider secured in the bottom of said cap and including spring fingers to automatically engage said shoulder, and jaws projecting to engage and bite into the material of said post to retain the spider in place.

ARTHUR A. DOTY.